June 3, 1941.  F. FALLA  2,244,451
WATER WALLS AND THE LIKE
Filed Oct. 30, 1936  6 Sheets-Sheet 2

INVENTOR
FERNANDO FALLA
BY
ATTORNEY

June 3, 1941. F. FALLA 2,244,451
WATER WALLS AND THE LIKE
Filed Oct. 30, 1936 6 Sheets-Sheet 3

INVENTOR
FERNANDO FALLA
BY
ATTORNEY

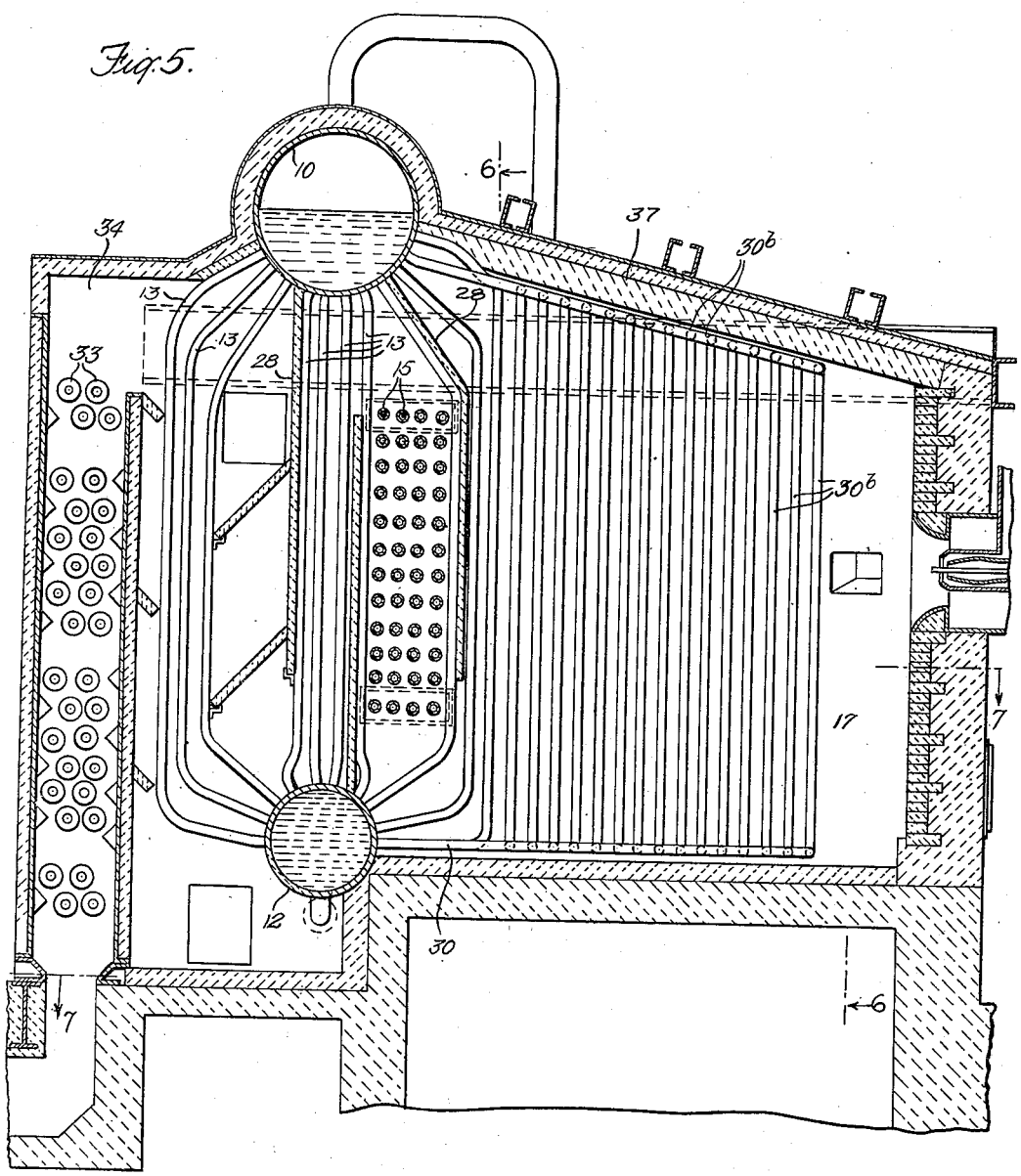

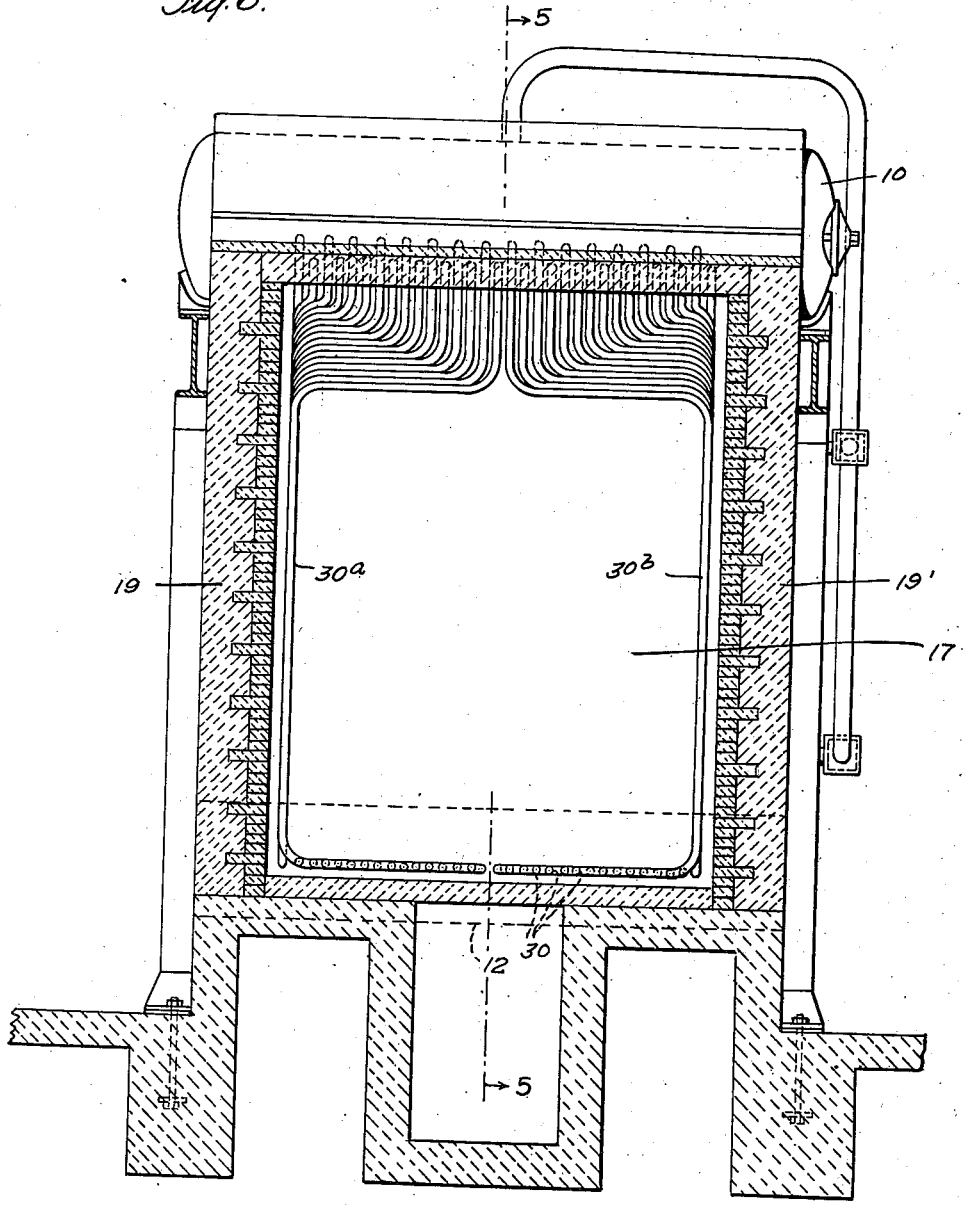

June 3, 1941.  F. FALLA  2,244,451
WATER WALLS AND THE LIKE
Filed Oct. 30, 1936  6 Sheets-Sheet 6
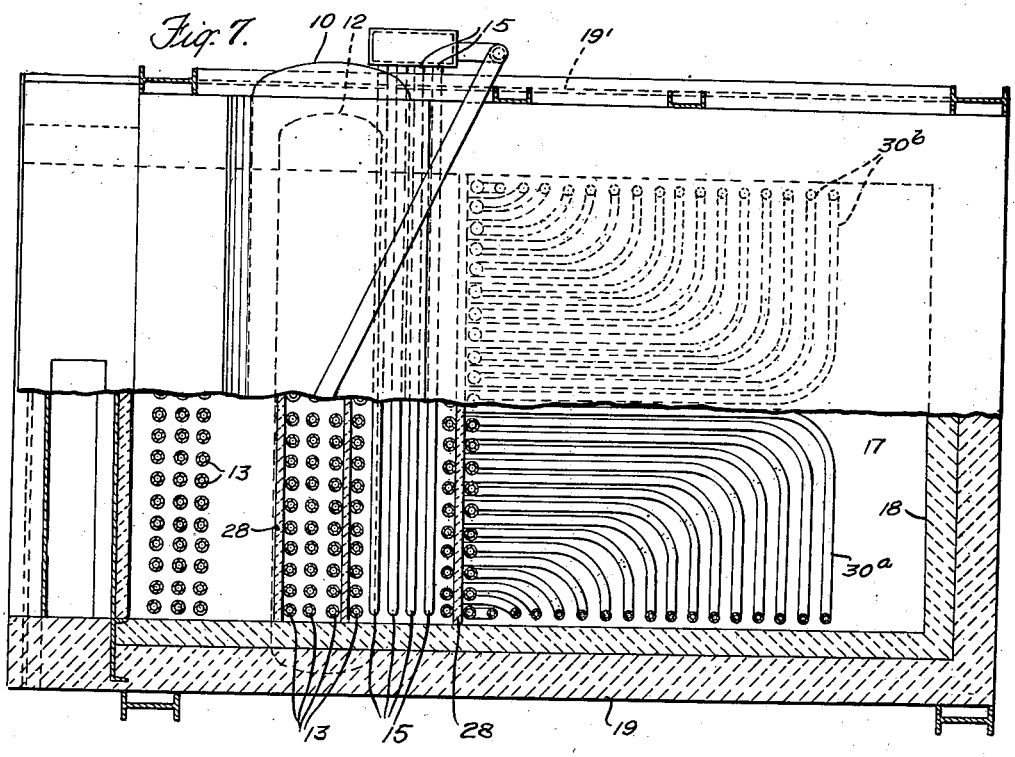
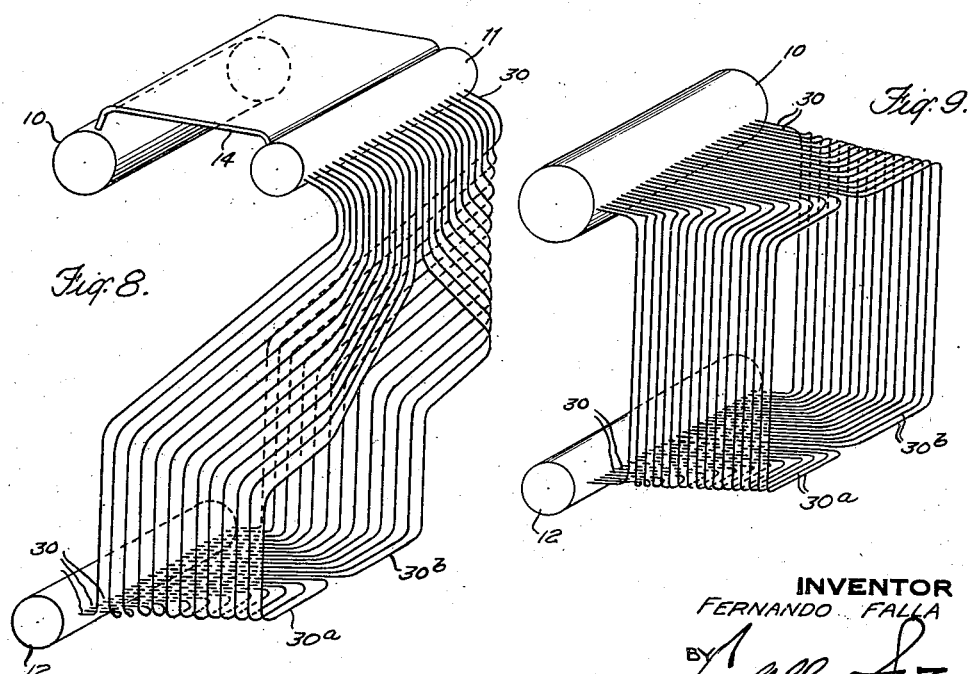
INVENTOR
FERNANDO FALLA
BY
ATTORNEY Patented June 3, 1941

2,244,451

UNITED STATES PATENT OFFICE 2,244,451

WATER WALLS AND THE LIKE

Fernando Falla, Maplewood, N. J., assignor to Foster Wheeler Corporation, New York, N. Y., a corporation of New York Application October 30, 1936, Serial No. 108,315

20 Claims. (Cl. 122—235)

My invention relates to furnaces operated at high temperatures in which the inner refractory walls thereof are protected, excessive furnace temperatures reduced, and undue slag deposits prevented by the cooling effect of a lining of fluid circulating conduits adjacent the furnace walls. Although my invention particularly pertains to water walls for modern steam generating units, it may also be applied to furnaces of other types in which the walls are cooled by similar means.

In water walls, circulation with the boiler is obtained by connections between the water wall tubes and the water space of the boiler drums. In present day installations owing to increasingly high furnace temperatures, it has been found very desirable in many instances to line practically the entire inner surface of the walls including the furnace floor and roof with such tubes, and in order to meet this demand, it has been necessary to provide numerous external headers and connections between separate groups or panels of water wall tubes and the boiler drums so as to satisfactorily and adequately distribute the cooling surface over the required total area.

It is an object of the present invention to provide a construction and arrangement of water wall tubes that eliminates entirely, or to a great extent, the need for such headers or other connections with a consequent substantial saving in expense, and at the same time makes it possible to readily protect all the exposed portions of the different furnace walls.

For a better understanding of the particular feeatures that characterize my invention, reference may be had to the following description considered in connection with the accompanying drawings forming a part thereof and in which:

Fig. 5 is a longitudinal vertical sectional view, taken on line 5—5 of Fig. 6, illustrating a further form of water tube boiler and its furnace in which another form of my invention is disclosed;

Fig. 6 is a vertical sectional view, taken on line 6—6 of Fig. 5;

Fig. 7 is a longitudinal horizontal combined plan and sectional view, the section being taken on line 7—7 of Fig. 5;

Fig. 8 is a more or less diagrammatic perspective view, illustrating the embodiment of the invention shown in Figs. 1, 2 and 3; and Fig. 9 is a more or less diagrammatic perspective view, illustrating the embodiment of the invention shown in Figs. 5, 6 and 7.

Like reference characters refer to like parts throughout the several views.

Figure 1:
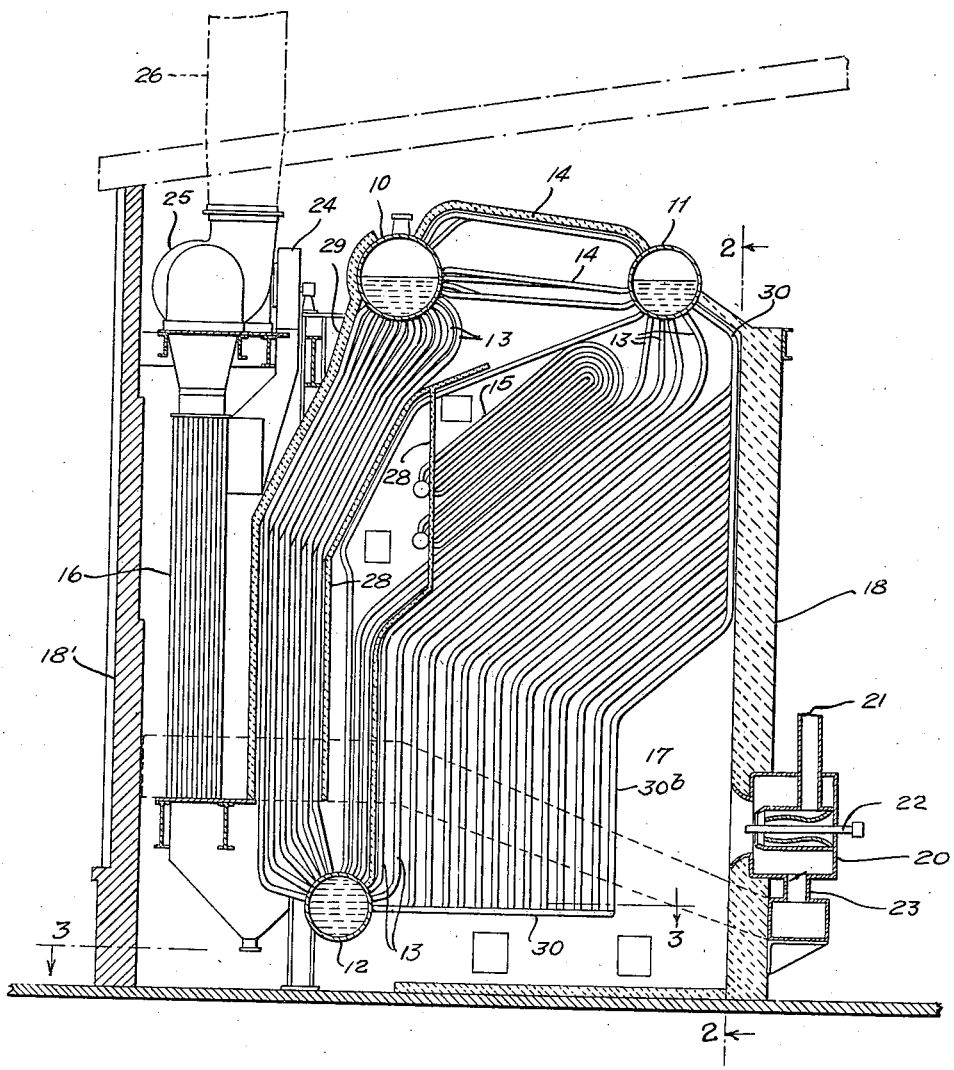
Fig. 1 is a longitudinal vertical sectional view, taken on line 1—1 of Fig. 2, illustrating a typical form of water tube boiler and its furnace, including an embodiment of my invention.
Figure 2:
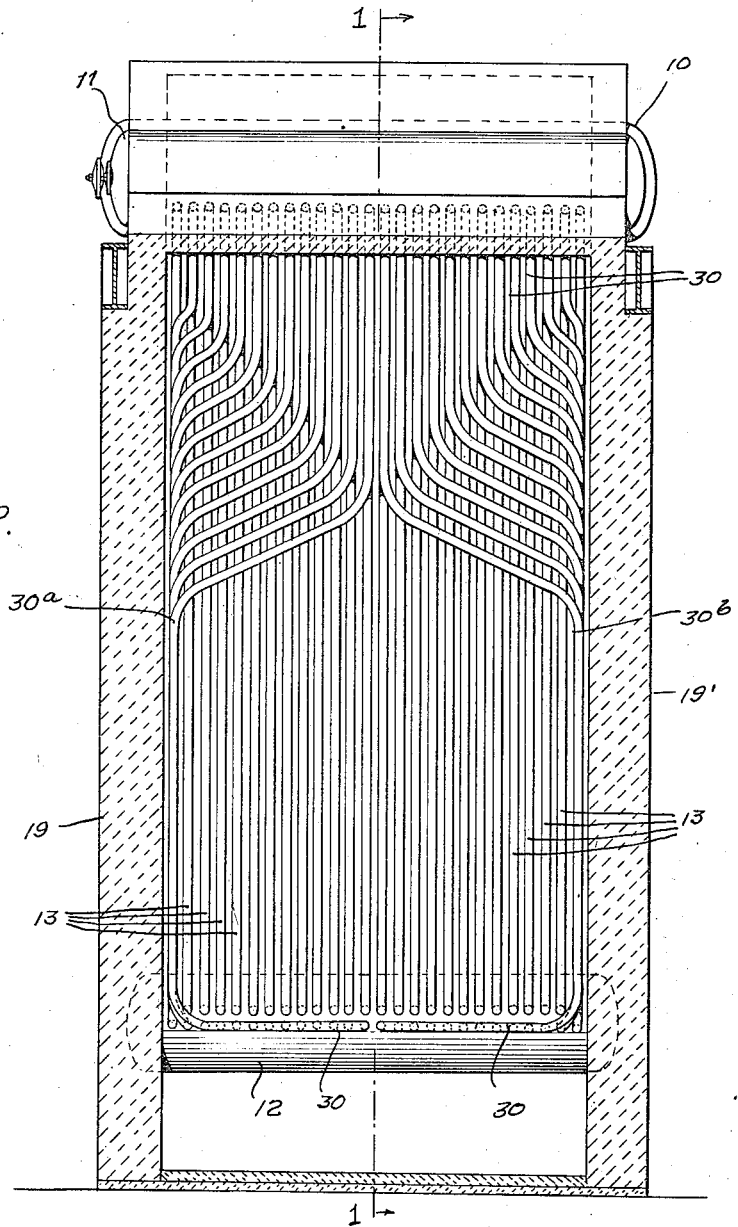
Fig. 2 is a somewhat enlarged vertical sectional view taken on line 2—2 of Fig. 1.
Figures 3, 4:
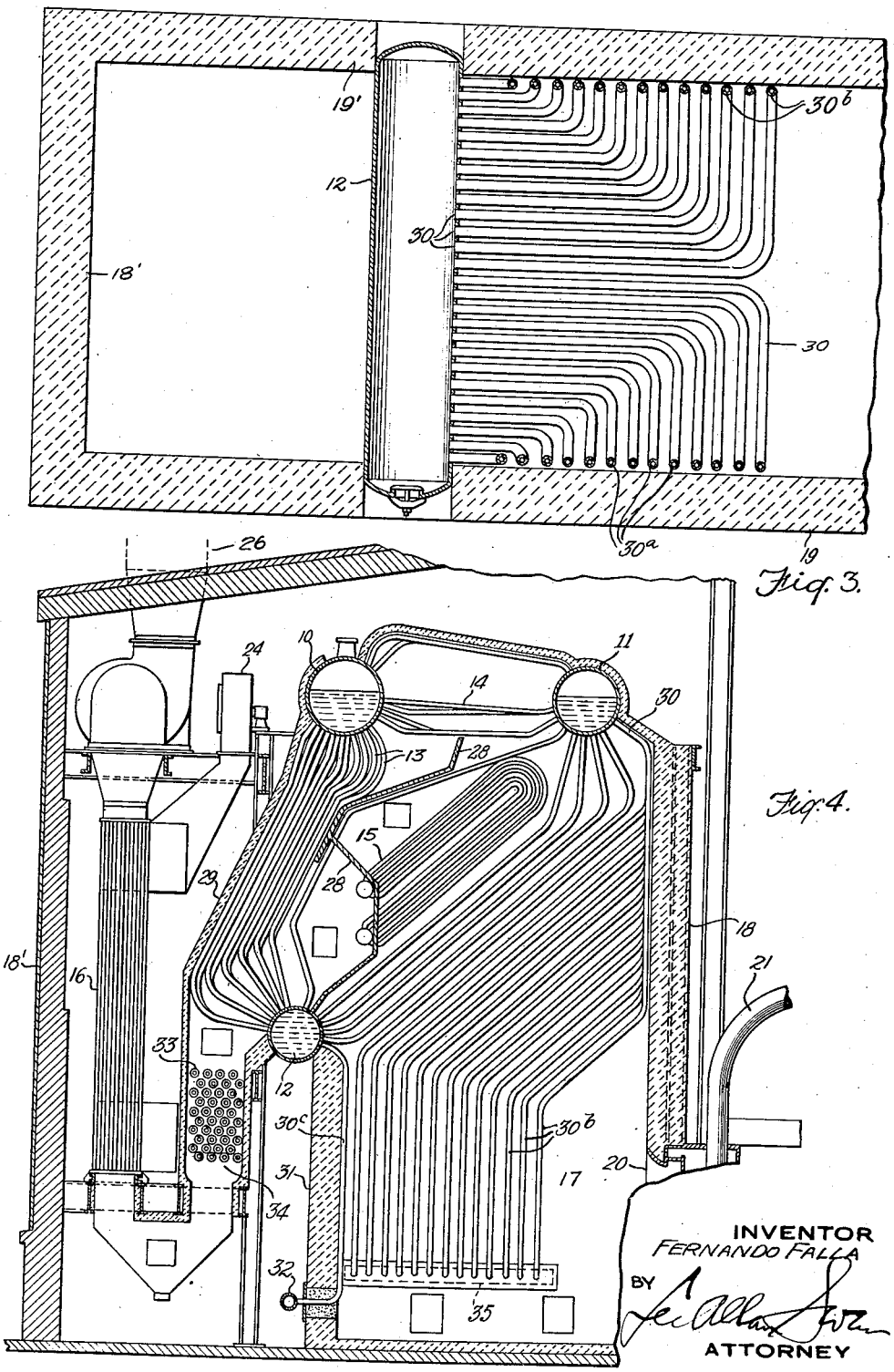
Fig. 3 is a horizontal sectional view taken on line 3—3 of Fig. 1.
Fig. 4 is a longitudinal vertical sectional view of another form of water tube boiler and its furnace, including an embodiment of my invention.

Referring to the drawings, particularly Figs. 1 to 3, the steam boiler illustrated includes an upper steam and water drum 10, a front drum 11, a lower or mud drum 12, steam generating tubes 13, circulators 14, a steam superheater 15, an air heater 16, a furnace chamber 17, and refractory front, rear and side walls 18, 18', 19 and 19' respectively, of the boiler furnace and setting. A fuel burner 20 is adapted for either pulverized coal or oil firing, and is suitably provided with the necessary fuel and preheated air connections therefor including a pulverized coal inlet 21, a fuel oil inlet nozzle 22, and a preheated air supply 23. A forced draft fan 24 supplies air to the air heater 16, and an induced draft fan 25 maintains a flow of heating gases at the desired velocity, from the combustion chamber over the steam generating and auxiliary heating surfaces of the boiler to the stack 26. The direction of the gas flow is controlled by baffles 28 and baffle wall 29.

The water wall tubes which are arranged and disposed in accordance with my invention, and those which provide the cooling means for the bottom, side and front walls of the furnace, are designated 30 generally. These tubes may be said to originate at the mud drum 12 (see Figs. 2, 3 and 8) from which they extend in a single horizontally disposed row. This row of tubes extends approximately the length of the mud drum and across the full width of the furnace chamber 17, while the tubes in the row extend in a horizontal direction towards the front wall 18. The two adjacent innermost or centrally disposed tubes in this row, extend approximately two-thirds of the distance from the mud drum to the front wall, at which point they make 90° turns in opposite directions, and extend in the same horizontal plane to a point adjacent the inner surface of each side wall. All the other tubes of this row on either side of the two innermost tubes, extend a lesser distance from the mud drum, and with the exception of the two outermost tubes, make similar turns and generally extend in parallel relationship with the two innermost tubes but the spacing of the portions of the tubes which extend at right angles to the side walls 19 and 19' is somewhat greater than the spacing of the portions which directly connect with the mud drum. Thus a floor of water circulating tubes is provided for a substantial area of the furnace bottom, and the original row of tubes 30 is equally divided into two groups of tubes 30ª and 30ᵇ. The tubes of both groups now turn at right angles and extend upwardly, parallel to the inner surface of each of the side walls for a substantial distance, after which they turn toward the front wall 18 at an angle of about 45°, and continue in this direction parallel to the side walls to points adjacent the inner surface of the front wall, where all the tubes, except the two outermost tubes of each group of the original row, turn inwardly from the side walls 19 and 19' toward the vertical center line of the front wall 18 (see Fig. 8) and at a moderate inclination as indicated in Fig. 2, and extend parallel and adjacent to the inner surface of front wall. The two innermost tubes of each group referring to the original horizontal row converge adjacent the vertical center line of the front wall and the other tubes of each group extend in the same direction but maintain their spaced relationship. After extending their full distance in the last mentioned direction, the tubes of both groups, with the exception noted, make acute angled turns and thereafter extend vertically upward to the top of the front wall 18 in a single row and in the same spaced relationship as that at which they originally left the mud drum 12. At the top of the front wall 18 the tubes turn rearwardly and after forming a lining for an upper portion of the furnace setting, enter the front drum 11. Where desirable, the tubes may be secured to the walls to which they are adjacent, by any suitable means.

With the tubes arranged and disposed as shown in the embodiment of the invention illustrated in Figs. 1 to 3 and 8, a major portion of the furnace bottom and all the exposed surfaces of the side and front walls have been lined by continuous fluid cooling conduits through which water from the boiler flows, without the use of the auxiliary headers, and external connections therefor, which ordinarily form part of such a circulatory system. Heretofore, in installations, in which similar furnace conditions and requirements were to be met, it has been customary to employ at least one, and frequently two, headers for each wall on which water wall tubes were placed. The minimum cost for such headers is four dollars ($4.00) a foot, and by way of example, it can be said that if five 20 foot headers were required for such an installation, they would cost not less than four hundred dollars ($400.00), exclusive of anything else. In comparison therewith, a cost of twenty cents ($.20) a bend for forming the individual tube bends disclosed in the described embodiment of my invention is relatively negligible, since the total amount for 300 or 400 bends would probably be less than seventy-five dollars ($75.00) or eighty dollars ($80.00). The cost of the header supports, blow down valves and accessories, and the various external tubular connections between the boiler drums and the headers, as already indicated, is another substantial item that my invention eliminates.

In operation, the water wall tubes 30, 30ª and 30ᵇ act as risers in the boiler circulation. The water in these tubes tends to rise and flow upwardly as its density decreases due to absorption of heat from the furnace walls and the products of combustion, and in this way a positive circulation is maintained between the water walls and other parts of the boiler.

The form of the invention illustrated in Fig. 4 is in general similar to the form shown in Figs. 1 to 3. However, in this disclosure, the boiler mud drum 12 is supported on a bridge wall 31, at an elevation well above the bottom of furnace chamber 17, and disposed on the furnace chamber side of the bridge wall 31 is a group of water wall tubes 30ᶜ that extend vertically from an external header 32 located adjacent the lower portion of bridge wall, to the mud drum. An economizer 33 is positioned in flue 34 in front of the air heater 16. Circulation through the water wall tubes 30ᶜ is provided for by external downcomer connections, not shown, between the mud drum and the header 32. Also, due to the height of the mud drum with respect to the lower portion of the furnace chamber, an external side wall header such as is shown at 35, is provided for each group of water wall tubes 30ª and 30ᵇ and the necessary external downcomer connections, not shown, between the mud drum and the headers. Otherwise the arrangement of the water wall tubes and the circulation therethrough is the same as in Figs. 1 to 3.

Figs. 5, 6 and 9 show my invention applied to a typical two drum boiler, in which the water wall tubes 30 are directly connected to the lower drum 12 as in Figs. 1 to 3, and are continuous from one drum to the other. In this arrangement, the tubes are divided into two groups and they extend from the lower drum 12 horizontally outwardly toward the front wall, turn at right angles toward the side walls and vertically upward at the side walls just as in the arrangement shown in Figs. 1 to 3 and 8. But instead of turning toward the front wall, the vertically extending portions of the tubes continue vertically upward to the roof 37 where they turn horizontally toward the opposite side wall and then toward and into the upper drum 10, with the horizontally disposed portions of the tubes connecting with the lower and upper drums, arranged identically as may be seen clearly in Fig. 9. With this arrangement, it is apparent that the water wall tubes 30, 30ª and 30ᵇ cover a major portion of the furnace chamber floor, the side walls 19 and 19', as well as the roof 37 of the furnace setting without the need of headers or auxiliary flow connections of any kind.

It will be seen that my invention makes it possible to readily meet one of the chief requirements in modern boiler plant and furnace construction with a very appreciable saving in expense.

It is to be understood that although the embodiments herein disclosed pertain particularly to water walls for boiler furnaces, my invention might also apply to superheater elements, or oil heating tubes similarly arranged on furnace walls, and that changes may be made in the forms and structure described herein without departing from the principles of the invention, which is not to be limited except by the scope of the appended claims.

What I claim is:

1. In a vapor generator furnace having a floor, side and front walls and a roof, and a mud drum and an upper drum, water wall tubes each disposed adjacent the boiler furnace floor, the side and front walls and the roof thereof, said water wall tubes being connected to the mud drum and extending continuously to the upper drum.

2. In a steam boiler furnace having a floor and walls, a plurality of upper drums and a mud drum connected by banks of steam generating tubes, water wall tubes directly connected to said mud drum and each extending continuously to one of said upper drums and forming a lining of continuous fluid circulating conduits for substantial portions of the floor of said steam boiler furnace and the side and front walls thereof.

3. In a steam boiler furnace having a floor, walls and a roof, the combination with a plurality of upper drums and a mud drum connected by banks of steam generating tubes, of water wall tubes connected to said mud drum and extending continuously to one of said upper drums, each of said water wall tubes forming a lining for substantial portions of the side walls, the front wall and a portion of the roof of said steam boiler furnace and setting.

4. A steam boiler comprising a setting, a furnace in the setting having a floor and walls, a plurality of upper drums and a mud drum adjacent the floor of said furnace connected by banks of steam generating tubes, and water wall tubes connected to said mud drum and extending continuously to one of said upper drums, each of said water wall tubes forming a lining adjacent substantial portions of the bottom of said furnace and the side and front walls of said setting.

5. A steam boiler comprising a setting, a furnace in the setting having a floor, walls and a roof, a steam and water drum and a mud drum connected by steam generating tubes, water wall tubes extending continuously from said mud drum to said steam and water drum and each forming a lining for substantial portions of the floor of said furnace and the side walls and the roof thereof.

6. A steam boiler comprising a setting, a furnace in the setting, a bridge wall in said setting and disposed at the rear of said furnace, a plurality of upper drums and a mud drum, said mud drum being disposed at the top of said bridge wall, headers disposed adjacent the side walls of said furnace in the lower portion thereof, and water wall tubes extending continuously from said headers to one of said upper drums and forming a lining for the major portion of the side walls, the front wall and a portion of the roof of said furnace and setting.

7. A furnace having a floor and walls, and lining means therefor comprising continuous fluid circulating conduits each having portions disposed adjacent the floor and other portions disposed adjacent a plurality of the walls, the last mentioned portions having parts at least which are substantially vertically disposed.

8. A furnace having a floor, walls and a roof, and lining means therefor comprising continuous fluid circulating conduits each having portions disposed adjacent the floor, front wall, side wall and the roof, the portions disposed adjacent said front and side walls having parts at least which are substantially vertically disposed.

9. A furnace having a floor, walls and a roof, and lining means therefor comprising continuous fluid circulating conduits each having portions disposed adjacent the lower portion of the furnace and substantial portions of a plurality of the walls and the roof, the portions disposed adjacent said walls having parts at least which are substantially vertically disposed.

10. In a vapor generator, a furnace having a floor, walls and a roof, a lower drum and an upper drum, and lining means for the furnace comprising continuous fluid circulating conduits each having portions disposed adjacent the furnace floor, a plurality of walls, and the roof, and extending between the lower and upper drums, the portions disposed adjacent said walls having parts at least which are substantially vertically disposed.

11. A furnace having a floor, walls and a roof, and lining means therefor comprising continuous fluid circulating conduits each having portions disposed adjacent the floor, a wall and the roof, each of said portions adjacent the floor and roof having parts extending substantially at right angles to each other, the portion adjacent the wall being substantially straight and extending substantially vertically of the wall.

12. A furnace having a floor and walls, and lining means therefor comprising continuous fluid circulating conduits each having portions disposed adjacent the floor and intersecting walls, each of said portions adjacent a wall having parts extending at obtuse angles to each other, one of said parts being substantially straight and extending substantially vertically of the wall.

13. A furnace having a floor and walls, and lining means therefor comprising continuous fluid circulating conduits each having portions disposed adjacent the floor and intersecting walls, each of said portions adjacent a wall having parts extending at obtuse angles to each other, and the portions adjacent the floor having parts extending substantially at right angles to each other.

14. A furnace having a floor, walls and a roof, and lining means therefor comprising continuous fluid circulating conduits each having portions disposed adjacent the floor, a wall and the roof, said conduits extending from and substantially normally to one edge portion of the floor, bending at substantially right angles and extending toward another edge portion of the floor, continuing adjacent a wall to the roof, extending from and substantially normally to an edge portion of the roof, bending at substantially right angles and extending toward another edge portion of the roof.

15. A furnace having a floor, walls and a roof, and lining means therefor comprising continuous fluid circulating conduits each having portions disposed adjacent the floor, a wall and the roof, said conduits extending from and substantially normally to one edge portion of the floor, bending at substantially right angles and extending toward another edge portion of the floor, continuing adjacent a wall to an intersecting wall and continuing along said last mentioned wall to the roof.

16. A furnace having a floor, walls and a roof, and lining means therefor comprising continuous fluid circulating conduits each having portions disposed adjacent the floor, a wall and the roof, said conduits extending from and substantially normally to one edge portion of the floor, bending at substantially right angles and extending toward another edge portion of the floor, continuing adjacent a wall in a direction substantially normally to the floor, bending at an obtuse angle and extending to an intersecting wall, and continuing along said last mentioned wall to the roof.

17. A furnace having a floor, walls and a roof, and lining means therefor comprising continuous fluid circulating conduits each having portions disposed adjacent the floor, a wall and the roof, said conduits extending from and substantially normally to one edge portion of the floor, bending at substantially right angles and extending toward another edge portion of the floor, continuing adjacent a wall in a direction substantially normally to the floor, bending at an obtuse angle and extending to an intersecting wall, continuing along said intersecting wall at acute angles to the edge thereof which intersects with the first wall, bending at obtuse angles and continuing to the roof.

18. In a furnace chamber having enclosing walls some of which are vertically disposed, a plurality of continuous fluid circulating conduits arranged for parallel fluid flow therethrough, each having substantially straight vertically extending portions disposed adjacent substantial areas of two vertical walls and having a substantially uniform flow area throughout its length.

19. In a furnace chamber having enclosing walls some of which are vertically disposed and a floor, a plurality of continuous fluid circulating conduits arranged for parallel fluid flow therethrough, each having a portion disposed adjacent the floor and substantially straight vertically extending portions disposed adjacent substantial areas of two of said vertical walls and having a substantially uniform flow area throughout its length.

20. A steam boiler comprising a setting, a furnace in the setting, a bridge wall in said setting and disposed at the rear of said furnace, a plurality of upper drums and a mud drum, said mud drum being disposed at the top of said bridge wall, headers disposed adjacent the side walls of said furnace in the lower portion thereof, and water wall tubes extending continuously from said headers to one of said upper drums and forming a lining for the major portion of the side walls and the front wall of the furnace.

FERNANDO FALLA.

CERTIFICATE OF CORRECTION.

Patent No. 2,244,451.   June 3, 1941.

FERNANDO FALLA.

It is hereby certified that error appears in the printed specification of the above numbered patent requiring correction as follows: Page 2, second column, line 75, claim 1, for "generator furnace" read --generator, a furnace--; and that the said Letters Patent should be read with this correction therein that the same may conform to the record of the case in the Patent Office.

Signed and sealed this 1st day of July, A. D. 1941.

(Seal)
Henry Van Arsdale,
Acting Commissioner of Patents.